Patented Apr. 5, 1932

1,852,761

UNITED STATES PATENT OFFICE

SALVADOR AGUILAR SULECIO, OF SAN FRANCISCO, CALIFORNIA

PROTECTIVE PAINT

No Drawing.   Application filed June 17, 1929.   Serial No. 371,734.

This invention relates to improvements in paints and more particularly to water mixed or lime paints.

Among the objects of the invention are to produce a fire resisting and moisture proof paint at a low cost.

Another object is to provide a paint in this class that has a heavy body adapted to seal porous surfaces.

A further object is to provide a paint base adapted to many uses and a variety of modifications to meet special conditions.

Other objects and advantages will appear as the description proceeds.

In this specification the invention is disclosed in the forms considered the best, but I do not wish to be understood as limiting it to those forms, because it may be combined in other forms. In the claims following the description it is desired to cover the invention in whatever form it may be embodied.

The preferred formula for the paint base is about as follows:

| | Pounds |
|---|---|
| Oxide of calcium (lime) | 75 |
| Portland cement | 25 |
| Linseed solution (or its equivalent) | 5 |

This base is made by adding to properly slacked lime in water solution the Portland cement or its equivalent in hard setting cement and mix by stirring.

The dry lime and dry cement can be dry mixed together before the water is added if preferred.

The linseed solution is made by boiling flaxseed in water to a jelly like or syrupy consistency.

The linseed solution is stirred into the water solution of lime and cement, and water added to thin it down to the proper spreading consistency for brushing or spraying onto the surface to be treated. The consistency is determined by the nature of the surface, as to its porosity, the penetration desired, or the thickness of the coat covering the surface.

In South and Central America, and parts of North America, and elsewhere, there are many forms of cacti, the juices of which may be substituted for the linseed solution. Notably in Guatemala and Central America there is found the prickly Indian fig, savila and escobilla plants, the juices of which are viscous and stringy, readily soluble in water and form tough rubber-like films similar to linseed oil, or the linseed solution described when oxidized.

These substitutes are prepared by chopping the cactus plants and leaching or boiling them in water, then straining out the pulp and using the solution as described in the case of the linseed solution, by stirring it into the lime and cement solution to form the desired paint base.

The cactus juices are cheaper in the regions where they are obtainable than the flaxseed. They are often superior to the flaxseed solution in the hot moist climate of the tropics.

These plant and seed juices add tenacity, density, spreading qualities and body to the mixture, and also aid in holding the lime and cement in suspension, and are readily soluble in water.

This paint base is fire and moisture proof, and is best adapted to wood, stone, brick, stucco and similar porous surfaces.

To paint metal such as tin roofs, galvanized iron, smooth cement, painted surfaces, and similar non-porous surfaces, add to the above formula:

| | |
|---|---|
| Animal or vegetable soap | 5 lbs. |
| Linseed oil | 8 quarts |
| Turpentine | 10 quarts |

The addition of the soap emulsifies the oils, and promotes adhesion to smooth surfaces.

This modified solution is not fire resisting, but is dense and moisture resisting and proof against atmospheric conditions.

Both formulas resist both hot and cold climatic conditions and will not check, scale, or disintegrate.

Color effects can be obtained by the addition of kalsomine, or other suitable color pigments to the paint base and modifications thereof. Houses painted with this paint are cooler in summer and warmer in winter.

Having thus described my invention, what is claimed and desired to secure by Letters Patent is:

1. A paint comprising oxide of calcium, cement, cactus juice, soap, oil, and turpentine.

2. A paint comprising the following ingredients in substantially the following proportions, oxide of calcium 75 pounds, Portland cement 25 pounds, 75 quarts of water, 8 quarts of linseed solution, 5 pounds of soap, 8 pounds of linseed oil, 10 quarts of turpentine.

In testimony whereof I have hereunto set my hand this 12th day of June, A. D. 1929.

SALVADOR AGUILAR SULECIO.